(12) United States Patent
Liu

(10) Patent No.: US 11,972,213 B2
(45) Date of Patent: Apr. 30, 2024

(54) EVENT RECOGNITION METHOD AND APPARATUS, MODEL TRAINING METHOD AND APPARATUS, AND STORAGE MEDIUM

(71) Applicant: Tencent Technology (Shenzhen) Company Limited, Guangdong (CN)

(72) Inventor: Shulin Liu, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 921 days.

(21) Appl. No.: 16/998,518

(22) Filed: Aug. 20, 2020

(65) Prior Publication Data

US 2020/0380210 A1 Dec. 3, 2020

Related U.S. Application Data

(63) Continuation of application No. PCT/CN2019/089068, filed on May 29, 2019.

(30) Foreign Application Priority Data

Jul. 3, 2018 (CN) .......................... 201810716380.7

(51) Int. Cl.
*G06F 40/30* (2020.01)
*G06F 40/295* (2020.01)
(Continued)

(52) U.S. Cl.
CPC ............ *G06F 40/295* (2020.01); *G06F 40/30* (2020.01); *G06N 5/04* (2013.01); *G06N 20/00* (2019.01)

(58) Field of Classification Search
CPC ....................................................... G10L 15/22
See application file for complete search history.

(56) References Cited

U.S. PATENT DOCUMENTS

2013/0275164 A1* 10/2013 Gruber .................. G10L 17/22
 705/5
2018/0060469 A1* 3/2018 Morgan .................. G06F 30/20
(Continued)

FOREIGN PATENT DOCUMENTS

CN 102298635 A 12/2011
CN 102521220 A 6/2012
(Continued)

OTHER PUBLICATIONS

Second Office Action issued on Chinese application CN201810716380.7 dated Jan. 12, 2023, 12 pages.
(Continued)

*Primary Examiner* — Seong-Ah A Shin
(74) *Attorney, Agent, or Firm* — Crowell & Moring LLP

(57) ABSTRACT

This application discloses an event recognition method, including: obtaining, by a terminal device, a target sentence used for recognizing a type of a target event; processing, by the terminal device, a target sentence based on an event recognition model, to obtain the type of the target event, the event recognition model being used for determining the type of the target event by using a trigger word in the target sentence and at least one context word of the trigger word, the trigger word being used for indicating candidate types of the target event, and the candidate types including the type of the target event; and outputting, by the terminal device, the type of the target event. According to the technical solutions of this application, an event recognition process is performed by using a trigger word and a context word of the trigger word. Such a word classification method for event recognition can improve recognition efficiency, and reference to the context word can improve accuracy of the event recognition.

13 Claims, 5 Drawing Sheets

(51) Int. Cl.
    *G06N 5/04*         (2023.01)
    *G06N 20/00*      (2019.01)

(56)               References Cited

U.S. PATENT DOCUMENTS

2018/0190268 A1*   7/2018   Lee .......................... G10L 15/02
2018/0285391 A1*  10/2018   Juneja ................ G06F 16/2282
2019/0266354 A1*   8/2019   Banerjee ................ G06F 16/93

FOREIGN PATENT DOCUMENTS

| CN | 104298665 A | 1/2015 |
|----|-------------|--------|
| CN | 104462229 A | 3/2015 |
| CN | 105677873 A | 6/2016 |
| CN | 106095928 A | 11/2016 |
| CN | 106445999 A | 2/2017 |
| CN | 106933800 A | 7/2017 |
| CN | 106951530 A | 7/2017 |
| CN | 107239445 A | 10/2017 |
| CN | 107247706 A | 10/2017 |

OTHER PUBLICATIONS

Office action issued on Chinese application 201810716380.7 dated Oct. 28, 2022, 15 pages.
International Search Report and Written Opinion dated Aug. 28, 2019 for PCT Application No. PCT/CN2019/089068, ten pages.

* cited by examiner

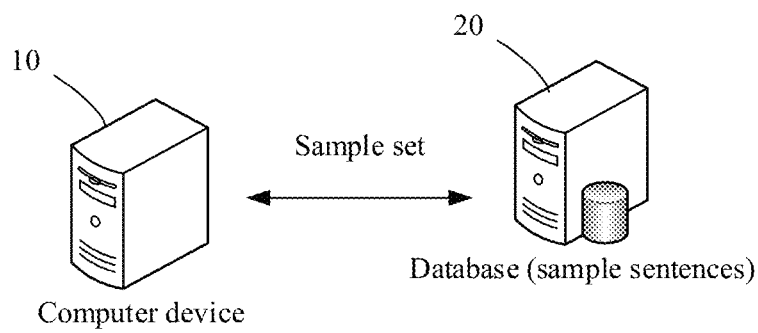

FIG. 1

```
┌─────────────────────────────────────────────────────────┐
│ A computer device obtains a sample set used for model   │
│ training, the sample set including sample sentences     │──— 101
│ respectively corresponding to a plurality of sample     │
│ events and respective types of the plurality of sample  │
│ events, and each sample sentence including a trigger    │
│ word and a context word of the trigger word             │
└─────────────────────────────────────────────────────────┘
                              │
                              ▼
┌─────────────────────────────────────────────────────────┐
│ The computer device trains a first event recognition    │──— 102
│ model according to each sample sentence, to obtain a    │
│ second event recognition model                          │
└─────────────────────────────────────────────────────────┘
```

FIG. 2

EVENT RECOGNITION METHOD AND APPARATUS, MODEL TRAINING METHOD AND APPARATUS, AND STORAGE MEDIUM

RELATED APPLICATION

This application is a continuation of and claims priority to PCT International Patent Application No. PCT/CN2019/089068, filed on May 29, 2019, which claims priority to Chinese Patent Application No. 201810716380.7, entitled "EVENT RECOGNITION METHOD AND APPARATUS, MODEL TRAINING METHOD AND APPARATUS, AND STORAGE MEDIUM" and filed with the National Intellectual Property Administration, PRC on Jul. 3, 2018, which are incorporated herein by reference in their entireties.

FIELD OF THE TECHNOLOGY

This application relates to the field of speech processing technologies, and specifically to an event recognition method and apparatus, an event recognition model training method and apparatus, and a computer-readable storage medium.

BACKGROUND OF THE DISCLOSURE

Nowadays, with the development of the Internet, demands for news reading has already shifted from traditional print media to Internet media. News published on large-scale web media portals such as Tencent, Netease, and Sina is characterized by a large amount of total release, a high update frequency, a large quantity of reading users, a wide distribution of readers, and the like. Individual users want to read news events they are interested in. In this regard, web media portal operators try a variety of means to identify news of interest to users by, for example, making subsequent news recommendation by using browsing histories of the users.

Regardless of which way the recommendation is made, a backend device needs to first recognize content of a news event before recommending the event to corresponding users. A current news event recognition method is mainly performing recognition in a mode matching manner. The mode matching recognition manner include identifying a paragraph of content, and then finding content matching the paragraph of content from a large quantity of data. Thus, it can be seen that the mode matching recognition manner is poor in portability, and has low event recognition efficiency as massive news events are likely to occur every minute.

SUMMARY

Embodiments of this application provide an event recognition method, which can effectively and accurately recognize different types of events. The embodiments of this application further provide a corresponding event recognition model training method and apparatus and a computer-readable storage medium.

According to a first aspect of the embodiments of this application, an event recognition method is provided, including:

obtaining, by a terminal device, a target sentence used for recognizing a type of a target event;

processing, by the terminal device, the target sentence based on an event recognition model, to obtain the type of the target event, the event recognition model being used for determining the type of the target event by using a trigger word in the target sentence and at least one context word of the trigger word, the trigger word being used for indicating candidate types of the target event, and the candidate types including the type of the target event; and outputting, by the terminal device, the type of the target event.

According to a second aspect of the embodiments of this application, an event recognition model training method is provided, including:

obtaining, by a computer device, a sample set used for model training, the sample set including sample sentences corresponding to a plurality of sample events and types of the plurality of sample events, and each sample sentence including a trigger word and a context word of the trigger word; and training, by the computer device, a first event recognition model according to each sample sentence, to obtain a second event recognition model, the second event recognition model being used for determining a target type of a target event by using a trigger word in a target sentence and a context word of the trigger word in the target sentence.

According to a third aspect of the embodiments of this application, an event recognition apparatus is provided, installed in a terminal device, including:

an obtaining unit, configured to obtain a target sentence used for recognizing a type of a target event;

a processing unit, configured to process, based on an event recognition model, the target sentence obtained by the obtaining unit, to obtain the type of the target event, the event recognition model being used for determining the type of the target event by using a trigger word in the target sentence and at least one context word of the trigger word, the trigger word being used for indicating candidate types of the target event, and the candidate types including the type of the target event; and an output unit, configured to output the type of the target event that is determined by the processing unit.

According to a fourth aspect of the embodiments of this application, an event recognition model training apparatus is provided, installed in a computer device, including:

an obtaining unit, configured to obtain a sample set used for model training, the sample set including sample sentences corresponding to a plurality of sample events and types of the plurality of sample events, and each sample sentence including a trigger word and a context word of the trigger word; and a model training unit, configured to train a first event recognition model according to each sample sentence obtained by the obtaining unit, to obtain a second event recognition model, the second event recognition model being used for determining a target type of a target event by using a trigger word in a target sentence and a context word of the trigger word in the target sentence.

According to a fifth aspect of the embodiments of this application, a terminal device is provided, including: an input/output (I/O) interface, a processor, and a memory, the memory storing a program instruction; and the processor being configured to execute the program instruction stored in the memory, to perform the foregoing method according to the first aspect.

According to a sixth aspect of the embodiments of this application, a computer device is provided, including: an I/O interface, a processor, and a memory, the memory storing a program instruction; and the processor being configured to execute the program instruction stored in the memory, to perform the foregoing method according to the second aspect.

According to another aspect of the embodiments of this application, a computer-readable storage medium is provided, storing an instruction, the instruction, when run on a computer, causing the computer to perform the foregoing method according to the first aspect.

According to still another aspect of the embodiments of this application, a computer-readable storage medium is provided, storing an instruction, the instruction, when run on a computer, causing the computer to perform the foregoing method according to the second aspect.

According to yet another aspect of the embodiments of this application, a computer program product is provided, including an instruction, when run on a computer, causing the computer to perform the method according to the first aspect.

According to still yet another aspect of the embodiments of this application, a computer program product is provided, including an instruction, when run on a computer, causing the computer to perform the method according to the second aspect.

According to the embodiments of this application, an event recognition process is performed by using the trigger word and the context word of the trigger word. Such a word classification method for event recognition can improve recognition efficiency, and reference to the context word can improve accuracy of the event recognition.

BRIEF DESCRIPTION OF THE DRAWINGS

FIG. 1 is a schematic diagram of an embodiment of an event recognition model training system according to the embodiments of this application.

FIG. 2 is a schematic diagram of another embodiment of an event recognition model training method according to the embodiments of this application.

DESCRIPTION OF EMBODIMENTS

Figure 3:
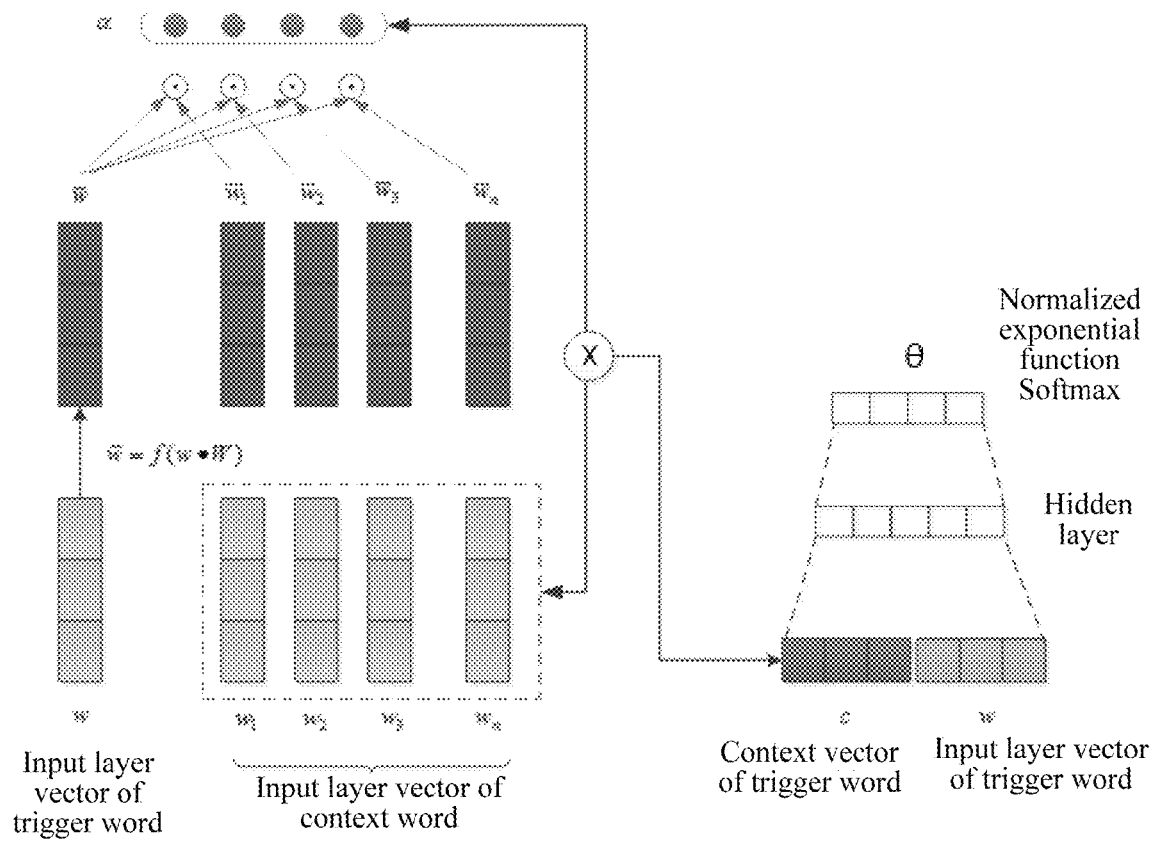
FIG. 3 is an exemplary schematic diagram of a vectorization representation of event recognition model training according to an embodiment of this application.

The technical solutions of the embodiments of this application are described in the following with reference to the accompanying drawings. The embodiments to be described are merely example embodiments of this application. A person of ordinary skill in the art may recognize that, with the development of technologies and emergence of new scenarios, the technical solutions provided in the embodiments of this application are also applicable to other similar technical problems.

The embodiments of this application provide an event recognition method, which can effectively and accurately recognize different types of events. The embodiments of this application further provide a corresponding event recognition model training method and apparatus and a computer-readable storage medium. Detailed descriptions are separately provided below.

Event recognition is based on an event recognition model. A training process of the event recognition model according to the embodiments of this application is first described below.

FIG. 1 is a schematic diagram of an embodiment of an event recognition model training system according to the embodiments of this application.

As shown in FIG. 1, the event recognition model training system according to this embodiment of this application includes a computer device 10 and a database 20, the database 20 storing a sample data set (alternatively referred to as sample set) used for event recognition model training. The sample set includes sample sentences respectively correspond to a plurality of sample events and types of the plurality of sample events. A sample event refers to an event used as a sample. The event is a change of a thing or a state that occurs at a specific time or in a specific period of time within a geographical area, which involves one or more roles and one or more actions. additionally, a change of a thing or a state that does not involve a time or a location but only a role and an action can also be referred to as an event. A sample sentence of the sample event may be a core sentence used for describing the sample event. For example, if the sample event is a news event, the sample sentence may be a title of the news event.

Each sample sentence includes a trigger word and a context word of the trigger word, the trigger word being a word in the sample sentence that can best indicate occurrence of the sample event. For example, Wang Xiaowu and Zhang Xiaohua got married in Shenzhen. As "married" can best indicate the event, "married" is a trigger word. In some scenarios, the same word may have different meanings. Therefore, event recognition needs to be performed with reference to a context word. For example, sentence 1 is "Yesterday afternoon, he/she directly went to the supermarket after leaving the company", and sentence 2 is "Grandpa left us forever, but we will never forget him". In sentence 1, "leaving" (leave) means going off duty, while in sentence 2, "left" (leave) means passing away. Thus, it can be seen that the same trigger word may indicate different event types. Therefore, reference to a context word of the trigger word is needed to accurately recognize an event type. In a recognition model training process, for each sample event, a type of the sample event is preset (or labeled). In this way, the computer device 10 can train a model by using the sample sentences and the labeled types of the events in the sample set, to obtain a model used for event recognition.

The event recognition model training method according to the embodiments of this application is described below with reference to FIG. 2.

As shown in FIG. 2, an embodiment of the event recognition model training method according to the embodiments of this application includes the following steps:

101. A computer device obtains a sample set used for model training, the sample set including sample sentences respectively corresponding to a plurality of sample events and respective types of the plurality of sample events, and each sample sentence including a trigger word and a context word of the trigger word.

102. The computer device trains a first event recognition model according to each sample sentence, to obtain a second event recognition model, the second event recognition model being used for determining a type of a target event by using a trigger word in a target sentence and a context word of the trigger word in the target sentence, and the target sentence being a sentence used for recognizing the type of the target event.

In this embodiment of this application, an event recognition model training process is performed by using trigger words of sample events in sample sentences and context words of the trigger words, as well as types of the sample events, thereby ensuring that an event recognition model capable of accurately performing event recognition can be obtained through training.

For example, the training, by the computer device, a first event recognition model according to each sample sentence, to obtain a second event recognition model may include:

preprocessing, by the computer device, a first sample sentence, to obtain each word in the first sample sentence, the first sample sentence being any one of the sample sentences;

performing, by the computer device, vector transformation on each word, to obtain an input layer vector of each word; and training, by the computer device, the first event recognition model according to the input layer vector of each word and a type of a sample event corresponding to the first sample sentence, to obtain the second event recognition model.

The preprocessing, by the computer device, a first sample sentence, to obtain each word in the first sample sentence may include:

recognizing, by the computer device, a named entity in the first sample sentence, the named entity being an object involved in the sample event;

anonymizing, by the computer device, the named entity; and segmenting, by the computer device, the first sample sentence after the anonymization into a word sequence, to obtain each word in the first sample sentence.

In this embodiment of this application, a preprocessing process includes anonymization and word segmentation on sentences. The anonymization is performed for a named entity, and the named entity may be a person, a company, or other roles or objects involved in a current event. The anonymization on the named entity can avoid using the named entity as a strong feature in the training process and establishing a certain connection between the named entity and a type of the event. For example, the event is "Pan Changjiang attended the Spring Festival Gala show", and the type of the event is "show". If anonymization is not performed, a certain connection may be established between Pan Changjiang and "show". After the model is trained, the named entity "Pan Changjiang" may be recognized in an event recognition process, and a relevant event may be recognized as a show event. However, it is possible that "Pan Changjiang" attended other events, for example, the daughter of Pan Changjiang got married. This is a marriage event, and a type of the event is "marriage" other than "show". Therefore, in the model training process, the anonymization on the named entity can make the model learn correct features and improve a generalization capability of the model.

The anonymization is to hide specific information and retain only type information indicating that the information is a named entity. For example, the event "the daughter of Pan Changjiang got married" after anonymization may be: PER of PER got married. PER is used for indicating that a word at this location belongs to a named entity.

Word segmentation is performed after the anonymization. The word segmentation is to segment a sentence into words. For example, "PER of PER got married" may be segmented into several words: "PER", "of", "PER", and "got married".

In addition, in this embodiment of this application, event recognition is accomplished by recognizing a trigger word. At an event recognition model training stage, because a type of a sample event is known, it may be considered that a trigger word in a sample sentence of the sample event can indicate the type of the sample event.

In the model training process, the computer device can use each word as a candidate trigger word and classify the word. A target type is a predefined event type, and an NA type is introduced to represent a non-event. A sentence may be used to generate a plurality of training samples, each having a different trigger word and corresponding event type label. The above example sentence "the daughter of Pan Changjiang got married" may be segmented into four samples shown in Table 1 below:

TABLE 1

| Candidate trigger word | Context | Type |
|---|---|---|
| Pan Changjiang | the daughter of Pan Changjiang got married | NA |
| of | the daughter of Pan Changjiang got married | NA |
| daughter | the daughter of Pan Changjiang got married | NA |
| married | the daughter of Pan Changjiang got married | marriage |

For example, when "married" is a candidate trigger word, "Pan Changjiang", "of", and "daughter" are context words of the trigger word. In the sample sentence, processing at a vector level is started after the trigger word and the context word are determined.

In this embodiment of this application, both the first event recognition model and the second event recognition model include three layers of fully-connected neural networks: an input layer, a hidden layer, and an output layer. In an event recognition process, each layer has a corresponding function. For example, a trigger word and a context word are transformed into an input layer vector at the input layer, and then the input layer vector is transformed into a hidden layer vector according to a relationship between the input layer and the hidden layer. A word may be transformed into an input layer vector by looking up a vector table.

Optionally, the training, by the computer device, the first event recognition model according to the input layer vector of each word and a type of a sample event corresponding to the first sample sentence, to obtain the second event recognition model may include:

transforming, by the computer device, the input layer vector of each word into a hidden layer vector, all the words including a first word, and the first word being a trigger word in the words;

determining, by the computer device, according to a hidden layer vector of each second word and a hidden layer vector of the first word, an attention weight of each second word, the second word being a word other than the first word;

determining, by the computer device, a context vector of the first word according to an input layer vector of each second word and the attention weight of each second word; and determining, by the computer device, a parameter of the first event recognition model according to the context vector of the first word, an input layer vector of the first word, and the type of the sample event corresponding to the first sample sentence, to obtain the second event recognition model.

In this embodiment of this application, as shown in FIG. 3, an input layer vector may be transformed into a hidden layer vector by using a formula $\overline{w}=f(w \bullet W)$, w may be an input layer vector of each word in a sample sentence, W is a transformation matrix, $\overline{w}$ is a hidden layer vector corresponding to w, and f(•) is a non-linear function such as a hyperbolic tangent tan h(•).

Because the solution in this embodiment of this application involves a context word of a trigger word, a context vector of the trigger word needs to be determined. To determine the context vector of the trigger word, an attention weight of the context word of the trigger word needs to be first determined. The attention weight is a weight of a correlation between each context word and the trigger word.

The attention weight of the context word may be determined through calculation by using the following formula:

$$\alpha_j = \frac{\exp(\overline{w} \cdot \overline{w}_j^T)}{\sum_{i=1}^{n-1} \exp(\overline{w} \cdot \overline{w}_i^T)}$$

where n represents a total quantity of words in a sample sentence, n−1 represents a quantity of context words in the sample sentence, that is, a quantity of second words other than a first word used as the trigger word, $\alpha_j$ represents an attention weight of a $j^{th}$ second word in n−1 second words, $\overline{w}$ is a hidden layer vector of the first word, $\overline{w}_j^T$ represents a transposition of a hidden layer vector of the $j^{th}$ second word, and $\overline{w}_i^T$ represents a transposition of a hidden layer vector of an $i^{th}$ second word, a value of i being an integer from 1 to n−1, and a value of j being an integer from 1 to n−1.

After $\alpha_j$ is determined, the context vector of the first word used as the trigger word may be determined by using the following formula:

$$c = \frac{1}{n-1}\sum_{j=1}^{n-1} w_j \alpha_j^T$$

where c is the context vector of the first word, $w_j$ is an input layer vector of the $j^{th}$ second word, and $\alpha_j^T$ is a transposition of an attention weight of the $j^{th}$ second word, the value of j being an integer from 1 to n−1.

After c is determined, the parameter θ of the first event recognition model may be determined according to c, the input layer vector w of the first word, and a type of a sample event corresponding to the sample sentence.

After the matrix transformation at the hidden layer and the matrix transformation at the input layer are performed on c and w, an input vector o is obtained, an $i^{th}$ element of o representing a confidence that the event recognition model determines that the given sample sentence belongs to an event type i.

To obtain a conditional probability p(i|x,θ), a normalization operation is performed on the vector o including m type confidences of a pre-configured event by using Softmax:

$$p(i \mid x, \theta) = \frac{e^{o_i}}{\sum_{k=1}^{m} e^{o_k}}$$

where k represents a $k^{th}$ event type, and if a total quantity of sample sets {(X(i);y(i))} used for training is T, a loss function of the event recognition model is defined as follows:

$$J(\theta) = -\sum_{i=1}^{T} \log p(y^{(i)} \mid x^{(i)}, \theta)$$

where a stochastic gradient descent method may be adopted to calculate a value of θ.

Figure 4:
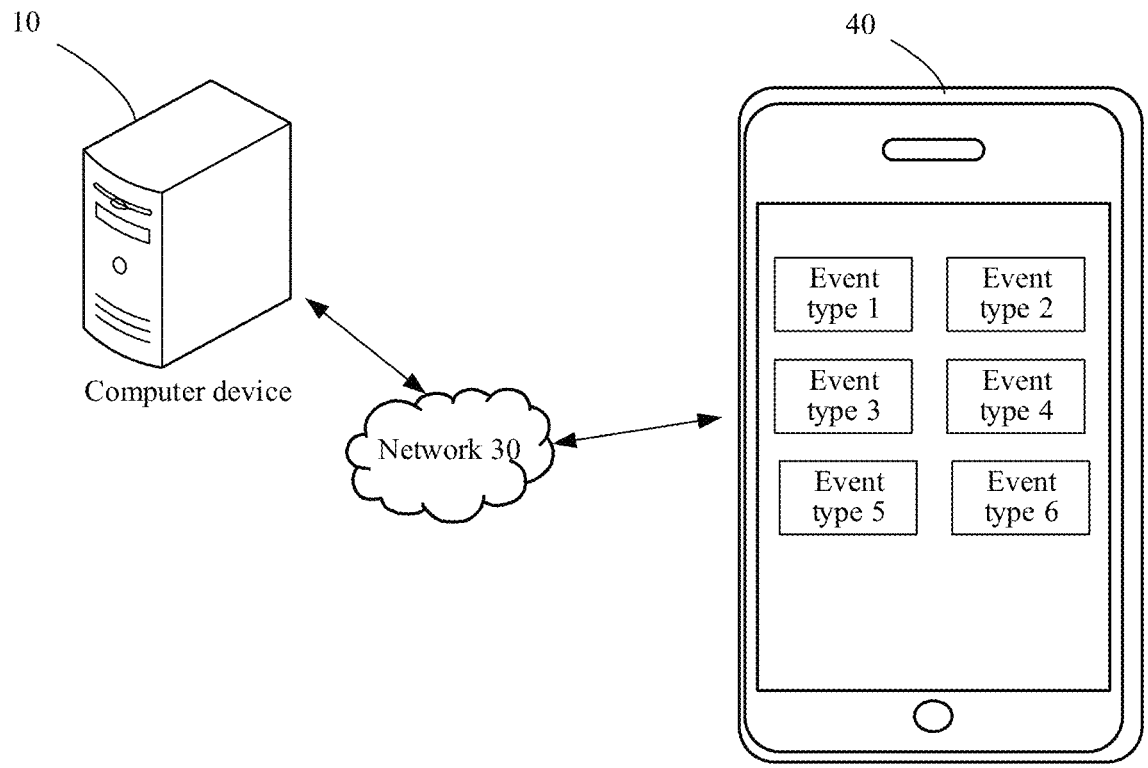
FIG. 4 is an exemplary schematic diagram of an event recognition application scenario according to an embodiment of this application.

An event recognition model training process is described in the foregoing several embodiments. After an event recognition model is trained, the event recognition model may be used for event recognition. The event recognition may be applied to news recommendation. As shown in FIG. 4, a computer device 10 may communicate with a terminal device 40 through a network 30, and the computer device 10 may be used for event recognition. Display areas for different event types are set in a news interface of the terminal device 40. The computer device 10 pushes an event of a type to the terminal device 40 after recognizing the type of the event. The terminal device 40 displays the news in a corresponding display area according to the type of the news event. FIG. 4 lists only several different event types, and a quantity of event types may be set or modified according to requirements. An event type in this embodiment of this application is a type of an event.

Figure 5:
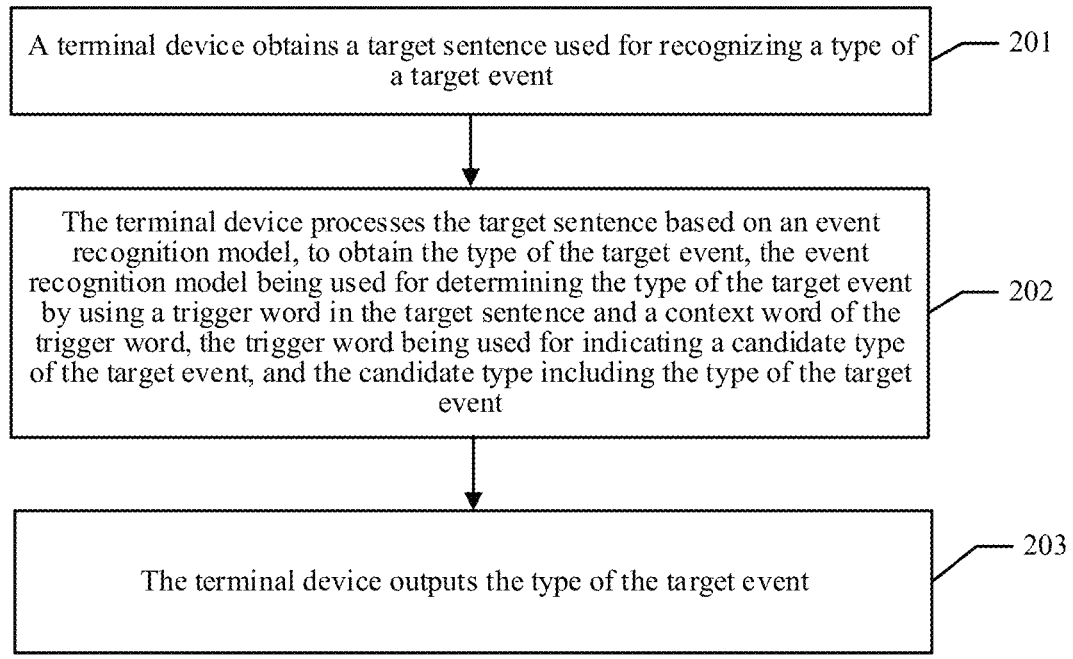
FIG. 5 is a schematic diagram of an embodiment of an event recognition method according to the embodiments of this application.

The event recognition method according to the embodiments of this application is described below with reference to FIG. 5. As shown in FIG. 5, an embodiment of the event recognition method according to the embodiments of this application includes the following steps:

201. A terminal device obtains a target sentence used for recognizing a type of a target event.

For news related to mobile phone publishing, for example, a news event titled "iPhone X publishing", the title "iPhone X publishing" may be determined as a target sentence.

202. The terminal device processes the target sentence based on an event recognition model, to obtain the type of the target event, the event recognition model being used for determining the type of the target event by using a trigger word in the target sentence and a context word of the trigger word, the trigger word being used for indicating a candidate type of the target event, and the candidate type including the type of the target event.

203. The terminal device outputs the type of the target event.

According to the embodiments of this application, an event recognition process is performed by using the trigger word and the context word of the trigger word. Such a word classification method for event recognition can improve recognition efficiency, and reliance ono the context word can improve accuracy of the event recognition.

As an example, the processing, by the terminal device, the target sentence based on an event recognition model, to obtain the type of the target event may include:

preprocessing, by the terminal device, the target sentence, to obtain each word in the target sentence;

performing, by the terminal device, vector transformation on each word, to obtain an input layer vector of each word; and determining, by the terminal device, the type of the target event according to the input layer vector of each word.

The preprocessing, by the terminal device, the target sentence, to obtain each word in the target sentence may include:

recognizing, by the terminal device, a named entity in the target sentence, the named entity being an object involved in the target event;

anonymizing, by the terminal device, the named entity; and segmenting, by the terminal device, the target sentence after the anonymization into a word sequence, to obtain each word in the target sentence.

In this embodiment of this application, a preprocessing process includes anonymization and word segmentation on sentences. The anonymization is performed for a named entity, and the named entity may be a person, a company, or other roles or objects involved in a current event. The anonymization on the named entity can avoid using the named entity as a strong feature in the training process and establishing a certain connection between the named entity and a type of the event. For example, the event is "Pan Changjiang attended the Spring Festival Gala show", and the type of the event is "show". If anonymization is not performed, a certain connection may be established between Pan Changjiang and "show". A named entity of "Pan Changjiang" may be recognized in an event recognition process, and a relevant event may be recognized as a show event. However, it is possible that "Pan Changjiang" attended other events, for example, the daughter of Pan Changjiang got married. This is a marriage event, and a type of the event is "marriage" other than "show". Therefore, in an event recognition process, the named entity is anonymized to avoid impact of the named entity on event recognition, and recognition efficiency can be improved as it is unnecessary to analyze the named entity specifically.

The anonymization is to hide specific information and retain only type information indicating that the information is a named entity. For example, the event "the daughter of Pan Changjiang got married" after anonymization may be: PER of PER got married. PER is used for indicating that a word at this location belongs to a named entity that should be anonymized.

Word segmentation is performed after the anonymization. The word segmentation is to segment a sentence into words. For example, "PER of PER got married" may be segmented into several words: "PER", "of", "PER", and "got married".

As an example, the determining, by the terminal device, the type of the target event according to the input layer vector of each word may include:

transforming, by the terminal device, the input layer vector of each word into a hidden layer vector, all the words including a first word, and the first word being any one of the words;

determining, by the terminal device according to a hidden layer vector of each second word and a hidden layer vector of the first word, an attention weight of each second word in a case of using the first word as a trigger word, the second word being a word other than the first word;

determining, by the terminal device, a context vector of the first word according to an input layer vector of each second word and the attention weight of each second word; and determining, by the terminal device, the type of the target event according to the context vector of the first word and an input layer vector of the first word.

Figure 6:
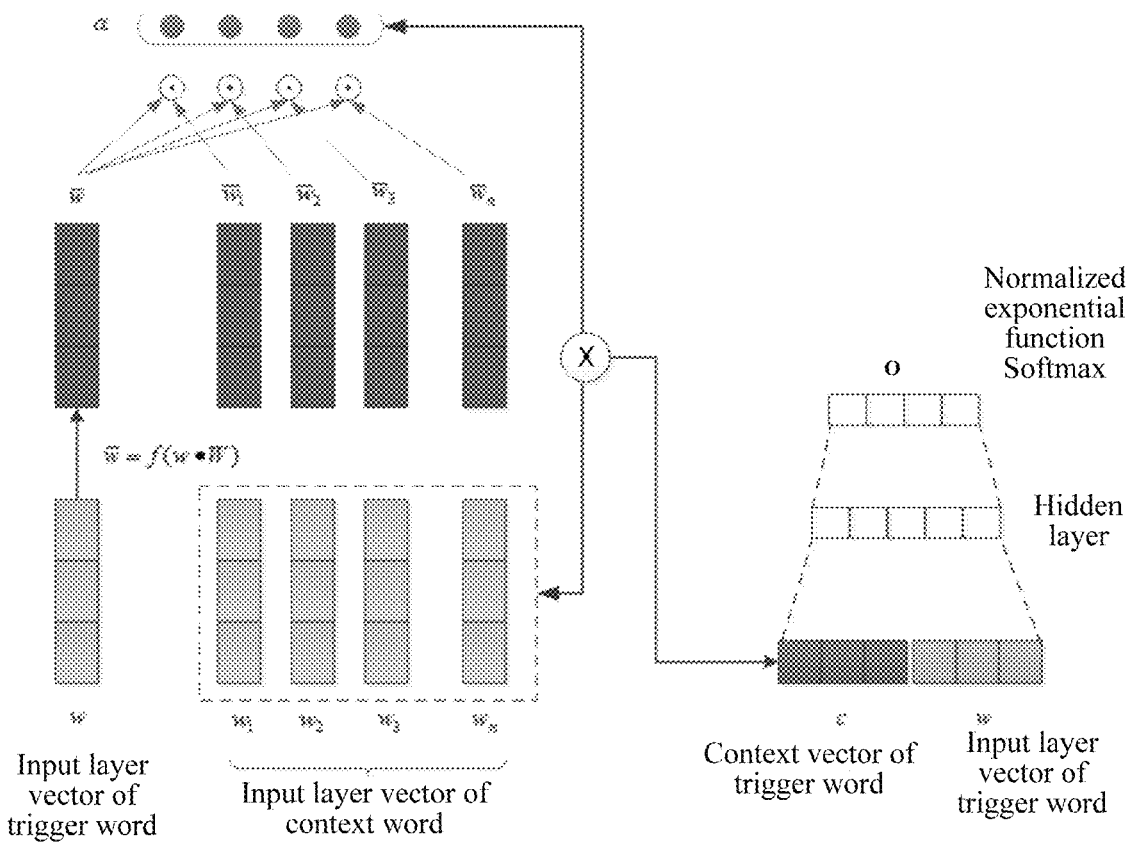
FIG. 6 is an exemplary schematic diagram of a vectorization representation of event recognition according to an embodiment of this application.

In this embodiment of this application, as shown in FIG. 6, an input layer vector may be transformed into a hidden layer vector by using a formula $\overline{w}=f(w \bullet W)$, w may be an input layer vector of each word in a sample sentence, W is a transformation matrix, $\overline{w}$ is a hidden layer vector corresponding to w, and $f(\bullet)$ is a non-linear function such as a hyperbolic tangent $\tan h(\bullet)$.

Because the solution in this embodiment of this application involves a context word of a trigger word, a context vector of the trigger word needs to be determined. To determine the context vector of the trigger word, an attention weight of the context word of the trigger word needs to be first determined. The attention weight is a weight of a correlation between each context word and the trigger word.

The attention weight of the context word may be determined through calculation by using the following formula:

$$\alpha_j = \frac{\exp(\overline{w} \cdot \overline{w}_j^T)}{\sum_{i=1}^{n-1}\exp(\overline{w} \cdot \overline{w}_i^T)}$$

where n represents a total quantity of words in a sample sentence, n−1 represents a quantity of context words in the sample sentence, that is, a quantity of second words other than a first word used as the trigger word, $\alpha_j$ represents an attention weight of a $j^{th}$ second word in n−1 second words, $\overline{w}$ is a hidden layer vector of the first word, $\overline{w}_j^T$ represents a transposition of a hidden layer vector of the $j^{th}$ second word, and $\overline{w}_j^T$ represents a transposition of a hidden layer vector of an $i^{th}$ second word, a value of i being an integer from 1 to n−1, and a value of j being an integer from 1 to n−1.

After $\alpha_j$ is determined, the context vector of the first word used as the trigger word may be determined by using the following formula:

$$c = \frac{1}{n-1}\sum_{j=1}^{n-1} w_j \alpha_j^T$$

where c is the context vector of the first word, $w_j$ is an input layer vector of the $j^{th}$ second word, and $\alpha_j^T$ is a transposition of an attention weight of the $j^{th}$ second word, the value of j being an integer from 1 to n−1.

After c is determined, the type of the target event may be determined by using c and the input layer vector w of the first word.

As an example, the determining, by the terminal device, the type of the target event according to the context vector of the first word and an input layer vector of the first word may include:

determining, by the terminal device according to the context vector of the first word, the input layer vector of the first word, and a parameter of the event recognition model, a confidence that the target event belongs to each candidate type in a case that the first word is the trigger word; and determining, by the terminal device, the type of the target event according to the confidence that the target event belongs to each candidate type.

In this embodiment of this application, a value of a parameter θ of the event recognition model is determined in the model training process shown in FIG. 3. Therefore, an output vector o to the second even recognition model may be obtained by performing a matrix transformation at a hidden layer and a matrix transformation at an input layer on c, w, and θ, an $i^{th}$ element in o representing a confidence that the event recognition model determines that the target sample is a type i.

To obtain a conditional probability p(i|x,θ) a normalization operation is performed on the vector o including m type confidences of a pre-configured event by using Softmax:

$$p(i \mid x, \theta) = \frac{e^{o_i}}{\sum_{k=1}^{m} e^{o_k}}$$

where k represents a $k^{th}$ event type, and if a total quantity of sample sets {(X(i);y(i))} used for training is T, a loss function of the event recognition model is defined as follows:

$$J(\theta) = -\sum_{i=1}^{T} \log p(y^{(i)} \mid x^{(i)}, \theta)$$

where a stochastic gradient descent method may be adopted to calculate y(i), which is a probability that the target event belongs to each type. In a process of determining the type of the target event, a type of a largest y(i) is selected as the type of the target event.

As an example, in this embodiment of this application, the processing, by the terminal device, the target sentence based on an event recognition model, to obtain the type of the target event may include:

preprocessing, by the terminal device, the target sentence, to obtain each word in the target sentence;

determining, by the terminal device, a first word in the target sentence that belongs to the trigger word; and determining, by the terminal device, the type of the target event according to a candidate type corresponding to the first word and a second word, the second word being a context word of the first word.

In this embodiment of this application, a correspondence between some words that may be used as trigger words and event types may be preset. Even when a trigger word corresponds to different event types, a calculation range may be narrowed. Other parts related to vector calculation may be understood with reference to corresponding content of the foregoing embodiments. Details are not repeated herein.

The above describes the processes of model training and event recognition in the embodiments of this application, and apparatuses and devices in the embodiments of this application are described below with reference to the accompanying drawings.

Figure 7:
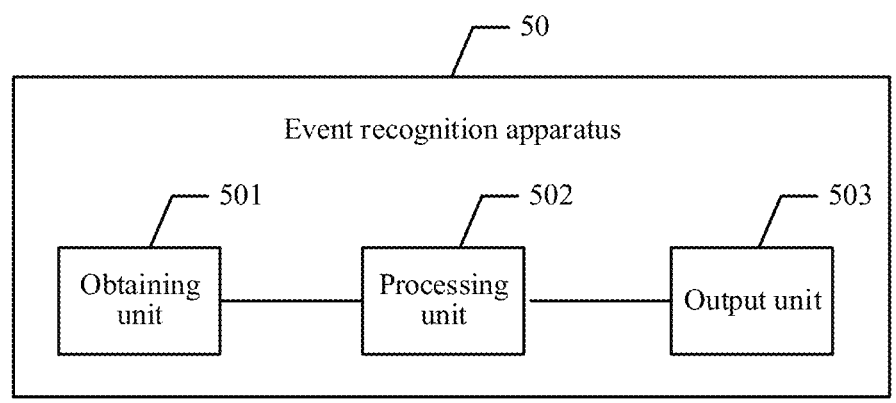
FIG. 7 is a schematic diagram of an embodiment of an event recognition apparatus according to the embodiments of this application.

As shown in FIG. 7, in an embodiment of an event recognition apparatus 50 provided in the embodiments of this application, the apparatus 50, which may be installed in a terminal device, includes:

an obtaining unit 501, configured to obtain a target sentence used for recognizing a type of a target event;

a processing unit 502, configured to process, based on an event recognition model, the target sentence obtained by the obtaining unit 501, to obtain the type of the target event, the event recognition model being used for determining the type of the target event by using a trigger word in the target sentence and a context word of the trigger word, the trigger word being used for indicating a candidate type of the target event, and the candidate type including the type of the target event; and an output unit 503, configured to output the type of the target event that is determined by the processing unit 502.

According to the embodiments of this application, an event recognition process is performed by using the trigger word and the context word of the trigger word. Such a word classification method for event recognition can improve recognition efficiency, and reference to the context word can improve accuracy of the event recognition.

Optionally, the processing unit 502 is configured to:
preprocess the target sentence, to obtain each word in the target sentence;
perform vector transformation on each word, to obtain an input layer vector of each word; and
determine the type of the target event according to the input layer vector of each word.

Optionally, the processing unit 502 is configured to:
transform the input layer vector of each word into a hidden layer vector, all the words including a first word, and the first word being any one of the words;
determine, according to a hidden layer vector of each second word and a hidden layer vector of the first word, an attention weight of each second word in a case of using the first word as a trigger word, the second word being a word other than the first word;
determine a context vector of the first word according to an input layer vector of each second word and the attention weight of each second word; and determine the type of the target event according to the context vector of the first word and an input layer vector of the first word.

Optionally, the processing unit 502 is configured to:
determine, according to the context vector of the first word, the input layer vector of the first word, and a parameter of the event recognition model, a confidence that the target event belongs to each candidate type in a case that the first word is the trigger word; and
determine, the type of the target event according to the confidence that the target event belongs to each candidate type.

Optionally, the processing unit 502 is configured to:
recognize a named entity in the target sentence, the named entity being an object involved in the target event;
anonymize the named entity; and
segment the target sentence after the anonymization into a word sequence, to obtain each word in the target sentence.

Optionally, the processing unit 502 is configured to:
preprocess the target sentence, to obtain each word in the target sentence;

determine a first word in the target sentence that belongs to the trigger word; and determine the type of the target event according to a candidate type corresponding to the first word and a second word, the second word being a context word of the first word.

Figure 8:
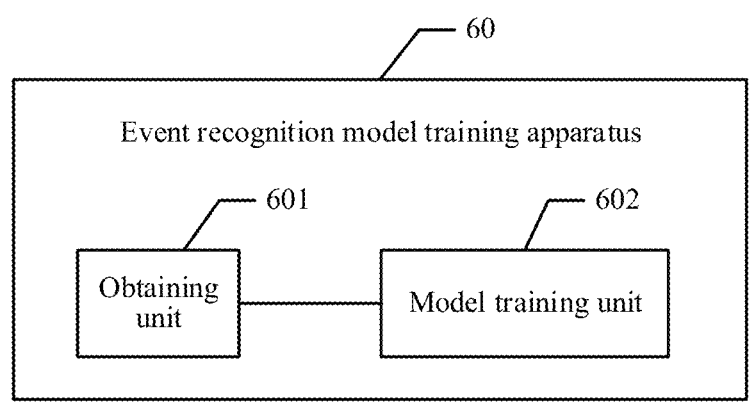
FIG. 8 is a schematic diagram of an embodiment of an event recognition model training apparatus according to the embodiments of this application.

With reference to FIG. 8, in an embodiment of an event recognition model training apparatus 60 provided in the embodiments of this application, the apparatus 60, which may be installed in a computer device, includes:

an obtaining unit 601, configured to obtain a sample set used for model training, the sample set including sample sentences respectively corresponding to a plurality of sample events and respective types of the plurality of sample events, and each sample sentence including a trigger word and a context word of the trigger word; and a model training unit 602, configured to train a first event recognition model according to each sample sentence obtained by the obtaining unit 601, to obtain a second event recognition model, the second event recognition model being used for determining a type of a target event by using a trigger word in a target sentence and a context word of the trigger word in the target sentence, and the target sentence being a sentence used for recognizing the type of the target event.

In this embodiment of this application, an event recognition model training process is performed by using trigger words in sample sentences of sample events and context words of the trigger words, as well as types of the sample events, thereby ensuring that an event recognition model that can accurately perform event recognition can be obtained through training.

Optionally, the model training unit 602 is configured to:

preprocess a first sample sentence, to obtain each word in the first sample sentence, the first sample sentence being any one of the sample sentences;

perform vector transformation on each word, to obtain an input layer vector of each word; and train the first event recognition model according to the input layer vector of each word and a type of a sample event corresponding to the first sample sentence, to obtain the second event recognition model.

Optionally, the model training unit 602 is configured to:

transform the input layer vector of each word into a hidden layer vector, all the words including a first word, and the first word being a trigger word in the words;

determine, according to a hidden layer vector of each second word and a hidden layer vector of the first word, an attention weight of each second word, the second word being a word other than the first word;

determine a context vector of the first word according to an input layer vector of each second word and the attention weight of each second word; and determine a parameter of the first event recognition model according to the context vector of the first word, an input layer vector of the first word, and the type of the sample event corresponding to the first sample sentence, to obtain the second event recognition model.

Optionally, the model training unit 602 is configured to:

recognize a named entity in the first sample sentence, the named entity being an object involved in the sample event;

anonymize the named entity; and segment the first sample sentence after the anonymization into a word sequence, to obtain each word in the first sample sentence.

The above description of the event recognition model training apparatus 60 may be understood with reference to corresponding content of the event recognition model training method. Details are not repeated herein.

Figure 9:
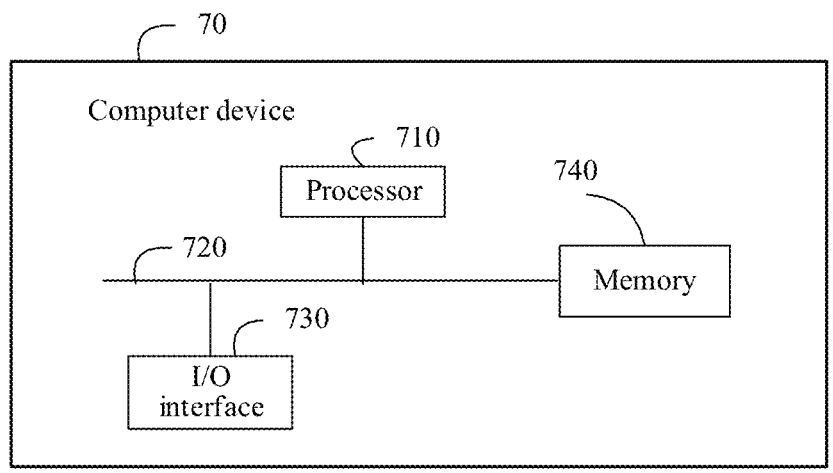
FIG. 9 is a schematic diagram of an embodiment of a computer device according to the embodiments of this application.

FIG. 9 is a schematic structural diagram of a computer device 70 according to an embodiment of this application. The computer device 70 includes a processor 710, a memory 740, and an I/O interface 730. The memory 740 may include a read-only memory (ROM) and a random access memory (RAM), and provide an instruction and data to the processor 710. A part of the memory 740 may further include a non-volatile RAM (NVRAM).

In some implementations, the memory 740 stores the following elements: an executable module or a data structure, a subset thereof, or an extension set thereof.

In this embodiment of this application, in an event recognition process, an operation instruction stored in the memory 740 (the operation instruction may be stored in an operating system) is invoked to:

obtain a target sentence used for recognizing a type of a target event;

process the target sentence based on an event recognition model, to obtain the type of the target event, the event recognition model being used for determining the type of the target event by using a trigger word in the target sentence and a context word of the trigger word, the trigger word being used for indicating a candidate type of the target event, and the candidate type including the type of the target event; and output the type of the target event.

According to the embodiments of this application, an event recognition process is performed by using the trigger word and the context word of the trigger word. Such a word classification method for event recognition can improve recognition efficiency, and reference to the context word can improve accuracy of the event recognition.

The processor 710 controls an operation of the computer device 70. The processor 710 may also be referred to as a central processing unit (CPU). In a specific application, components of the computer device 70 are coupled by using a bus system 720. In addition to a data bus, the bus system 720 may further include a power bus, a control bus, a status signal bus, and the like. However, for ease of clear description, all types of buses in the figure are marked as the bus system 720.

The method disclosed in the foregoing embodiment of this application may be applied to the processor 710 or implemented by the processor 710. The processor 710 may be an integrated circuit chip with a signal processing capability. In an implementation process, steps in the foregoing methods may be implemented by using a hardware integrated logical circuit in the processor 710, or by using an instruction in a form of software. The processor 710 may be a general-purpose processor, a digital signal processor (DSP), an application-specific integrated circuit (ASIC), a field programmable gate array (FPGA), or another programmable logical device, discrete gate or transistor logical device, or a discrete hardware component. The processor may implement or perform the methods, the steps, and the logical block diagrams that are disclosed in the embodiments of this application. The general-purpose processor may be a microprocessor or the processor may be any conventional processor or the like. The steps of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a ROM, a programmable ROM, an electrically erasable programmable memory, or a register. The storage medium is located in the storage 740, and the processor 710 reads information in the storage 740 and completes the steps in the foregoing methods in combination with the hardware thereof.

Optionally, the processor 710 is configured to:
preprocess the target sentence, to obtain each word in the target sentence;
perform vector transformation on each word, to obtain an input layer vector of each word; and
determine the type of the target event according to the input layer vector of each word.

Optionally, the processor 710 is configured to:
transform the input layer vector of each word into a hidden layer vector, all the words including a first word, and the first word being any one of the words;
determine, according to a hidden layer vector of each second word and a hidden layer vector of the first word, an attention weight of each second word in a case of using the first word as a trigger word, the second word being a word other than the first word;
determine a context vector of the first word according to an input layer vector of each second word and the attention weight of each second word; and determine the type of the target event according to the context vector of the first word and an input layer vector of the first word.

Optionally, the processor 710 is configured to:
determine, according to the context vector of the first word, the input layer vector of the first word, and a parameter of the event recognition model, a confidence that the target event belongs to each candidate type in a case that the first word is the trigger word; and
determine, the type of the target event according to the confidence that the target event belongs to each candidate type.

Optionally, the processor 710 is configured to:
recognize a named entity in the target sentence, the named entity being an object involved in the target event;
anonymize the named entity; and
segment the target sentence after the anonymization into a word sequence, to obtain each word in the target sentence.

Optionally, the processor 710 is configured to:
preprocess the target sentence, to obtain each word in the target sentence;
determine a first word in the target sentence that belongs to the trigger word; and
determine the type of the target event according to a candidate type corresponding to the first word and a second word, the second word being a context word of the first word.

In addition, the computer device for event recognition model training may also be understood with reference to FIG. 9. In an event recognition model training process:
the processor 710 is configured to:
obtain a sample set used for model training, the sample set including sample sentences respectively corresponding to a plurality of sample events and respective types of the plurality of sample events, and each sample sentence including a trigger word and a context word of the trigger word; and
train a first event recognition model according to each sample sentence, to obtain a second event recognition model, the second event recognition model being used for determining a type of a target event by using a trigger word in a target sentence and a context word of the trigger word in the target sentence, and the target sentence being a sentence used for recognizing the type of the target event.

Optionally, the processor 710 is configured to:
preprocess a first sample sentence, to obtain each word in the first sample sentence, the first sample sentence being any one of the sample sentences;
perform vector transformation on each word, to obtain an input layer vector of each word; and
train the first event recognition model according to the input layer vector of each word and a type of a sample event corresponding to the first sample sentence, to obtain the second event recognition model.

Optionally, the processor 710 is configured to:
transform the input layer vector of each word into a hidden layer vector, all the words including a first word, and the first word being a trigger word in the words;
determine, according to a hidden layer vector of each second word and a hidden layer vector of the first word, an attention weight of each second word, the second word being a word other than the first word;
determine a context vector of the first word according to an input layer vector of each second word and the attention weight of each second word; and
determine a parameter of the first event recognition model according to the context vector of the first word, an input layer vector of the first word, and the type of the sample event corresponding to the first sample sentence, to obtain the second event recognition model.

Optionally, the processor 710 is configured to:
recognize a named entity in the first sample sentence, the named entity being an object involved in the sample event;
anonymize the named entity; and
segment the first sample sentence after the anonymization into a word sequence, to obtain each word in the first sample sentence.

The above description of the computer device 70 may be understood with reference to the description in FIG. 1 to FIG. 6. Details are not repeated herein.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instruction is loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a web site, computer, server, or data center to another web site, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

A person of ordinary skill in the art may understand that all or some of the steps of all methods of the foregoing embodiments may be completed by a program instructing related hardware, the program may be stored in a computer-readable storage medium, and the storage medium may include: a ROM, a RAM, a magnetic disk, an optical disc, or the like.

The event recognition method and apparatus, the event recognition model training method and apparatus, and the computer-readable storage medium provided in the embodiments of this application are described above in detail. Specific examples are applied herein to explain the principle and implementation of this application, and the description of the above embodiments is only used for helping to understand the method and core idea of this application; besides, for a person of ordinary skill in the art, there will be changes in the specific implementation and application scope according to the idea of this application. In conclusion, the content of the specification is not to be construed as a limitation to this application.

INDUSTRIAL APPLICABILITY

With the method of obtaining a target sentence used for recognizing a type of a target event, processing the target sentence based on an event recognition model, to obtain the type of the target event, and outputting the type of the target event in this application, an event recognition process may be performed by using a trigger word and a context word of the trigger word. Such a word classification method for event recognition can improve recognition efficiency, and reference to the context word can improve accuracy of the event recognition.

What is claimed is:

1. An event recognition method, comprising:
    obtaining, by a terminal device, a target sentence used for recognizing a type of a target event;
    processing, by the terminal device, the target sentence based on an event recognition model, to obtain the type of the target event,
        the event recognition model being used for determining the type of the target event by using a trigger word in the target sentence and at least one context word of the trigger word,
        the trigger word being used for indicating candidate types of the target event, and the candidate types comprising the type of the target event;
    determining, by the terminal device according to a context vector of the trigger word, an input layer vector of the trigger word, and a parameter of the event recognition model, a confidence that the target event belongs to each of the candidate types;
    determining, by the terminal device, the type of the target event according to the confidence that the target event belongs to each of the candidate types; and
    outputting, by the terminal device, the type of the target event.

2. The method according to claim 1, wherein processing, by the terminal device, the target sentence based on an event recognition model, to obtain the type of the target event comprises:
    preprocessing, by the terminal device, the target sentence, to obtain a set of words in the target sentence;
    performing, by the terminal device, vector transformation on each word of the set of words, to obtain the input layer vector of each word; and
    determining, by the terminal device, the type of the target event according to the input layer vector of each word.

3. The method according to claim 2, wherein determining, by the terminal device, the type of the target event according to the input layer vector of each word comprises:
    transforming, by the terminal device, the input layer vector of each word into a hidden layer vector, wherein the set of words comprises the trigger word being any one of the words;
    determining, by the terminal device according to a hidden layer vector of each of the at least one context word(s) and a hidden layer vector of the trigger word, an attention weight of each context word, wherein each context word comprises a word of the set of words other than the trigger word;
    determining, by the terminal device, the context vector of the trigger word according to the input layer vector of each context word and the attention weight of each context word; and
    determining, by the terminal device, the type of the target event according to the context vector of the trigger word and the input layer vector of the trigger word.

4. The method according to claim 2, wherein preprocessing, by the terminal device, the target sentence, to obtain the set of words in the target sentence comprises:
    recognizing, by the terminal device, a named entity in the target sentence, the named entity being an object involved in the target event;
    anonymizing, by the terminal device, the named entity; and
    segmenting, by the terminal device, the target sentence after the anonymization into a word sequence, to obtain the set of words in the target sentence.

5. The method according to claim 1, wherein processing, by the terminal device, the target sentence based on an event recognition model, to obtain the type of the target event comprises:
    preprocessing, by the terminal device, the target sentence, to obtain a set of words in the target sentence;
    determining, by the terminal device, the trigger word among the set of words in the target sentence; and
    determining, by the terminal device, the type of the target event according to candidate types corresponding to the trigger word and the at least one context word, in the target sentence.

6. A terminal device, comprising a processor and a memory for storing instructions, wherein the processor when executing the instructions from the memory, is configured to:
    obtain a target sentence used for recognizing a type of a target event;
    process, based on an event recognition model, the target sentence, to obtain the type of the target event, the event recognition model being used for determining the type of the target event by using a trigger word in the target sentence and at least one context word of the trigger word, the trigger word being used for indicating candidate types of the target event, and the candidate types comprising the type of the target event;
    determine, according to a context vector of the trigger word, an input layer vector of the trigger word, and a parameter of the event recognition model, a confidence that the target event belongs to each of the candidate types;

determine the type of the target event according to the confidence that the target event belongs to each of the candidate types; and output the type of the target event.

7. The terminal device according to claim 6, wherein processor, when executing the instructions to process the target sentence based on an event recognition model to obtain the type of the target, is configured to:

preprocess the target sentence, to obtain a set of words in the target sentence;

perform vector transformation on each word of the set of words, to obtain the input layer vector of each word; and determine the type of the target event according to the input layer vector of each word.

8. The terminal device according to claim 7, wherein the processor, when executing the instructions to determine the type of the target event according to the input layer vector of each word, is configured to:

transform the input layer vector of each word into a hidden layer vector, wherein the set of words comprises the trigger word being any one of the words;

determine, according to a hidden layer vector of each context word and a hidden layer vector of the trigger word, an attention weight of each context word when using the trigger word, wherein each context word comprises a word of the set of words other than the trigger word;

determine the context vector of the trigger word according to the input layer vector of each context word and the attention weight of each context word; and determine the type of the target event according to the context vector of the trigger word and the input layer vector of the trigger word.

9. The terminal device according to claim 7, wherein the processor, when executing the instructions to preprocess the target sentence, to obtain the set of words in the target sentence, is configured to:

recognize a named entity in the target sentence, the named entity being an object involved in the target event;

anonymize the named entity; and segment the target sentence, after the anonymization of the named entity, into a word sequence, to obtain the set of words in the target sentence.

10. The terminal device according to claim 6, wherein the processor, when executing the instructions to process the target sentence based on an event recognition model to obtain the type of the target event, is configured to:

preprocess the target sentence to obtain a set of words in the target sentence;

determine the trigger word among the set of words in the target sentence; and determine the type of the target event according to candidate types corresponding to the trigger word and the context word of the trigger word among at least one context words in the target sentence.

11. A non-transitory computer readable medium storing instructions, wherein the instructions, when executed by a computer processor of a terminal device, causes the terminal device to:

obtain a target sentence used for recognizing a type of a target event;

process the target sentence based on an event recognition model, to obtain the type of the target event, the event recognition model being used for determining the type of the target event by using a trigger word in the target sentence and at least one context word of the trigger word, the trigger word being used for indicating candidate types of the target event, and the candidate types comprising the type of the target event;

determine, according to a context vector of the trigger word, an input layer vector of the trigger word, and a parameter of the event recognition model, a confidence that the target event belongs to each of the candidate types; and determine the type of the target event according to the confidence that the target event belongs to each of the candidate types; and output the type of the target event.

12. The non-transitory computer readable medium of claim 11, wherein the instructions, when executed by the computer processor to cause the terminal device to process the target sentence based on an event recognition model to obtain the type of the target, is configured to cause the terminal device to:

preprocess the target sentence, to obtain a set of words in the target sentence;

perform vector transformation on each word of the set of words, to obtain an input layer vector of each word; and determine the type of the target event according to the input layer vector of each word.

13. The non-transitory computer readable medium of claim 12, wherein the instructions, when executed by the computer processor to cause the terminal device to determine the type of the target event according to the input layer vector of each word, is configured to cause the terminal device to:

transform the input layer vector of each word into a hidden layer vector, wherein the set of words comprises a trigger word, and the trigger word being any one of the words;

determine, according to a hidden layer vector of each context word and a hidden layer vector of the trigger word, an attention weight of each context word when using the trigger word, wherein each context word comprises a word of the set of words other than the trigger word;

determine a context vector of the trigger word according to the input layer vector of each context word and the attention weight of each context word; and determine the type of the target event according to the context vector of the trigger word and the input layer vector of the trigger word.

* * * * *